US008104918B2

United States Patent
Hsiao

(10) Patent No.: US 8,104,918 B2
(45) Date of Patent: Jan. 31, 2012

(54) BACKLIGHT MODULE AND LIQUID CRYSTAL DISPLAY UTILIZING SAME

(75) Inventor: Chih-Chung Hsiao, Miao-Li (TW)

(73) Assignee: Chimei Innolux Corporation, Miao-Li County (TW)

( * ) Notice: Subject to any disclaimer, the term of this patent is extended or adjusted under 35 U.S.C. 154(b) by 609 days.

(21) Appl. No.: 12/283,857

(22) Filed: Sep. 15, 2008

(65) Prior Publication Data

US 2009/0073684 A1 Mar. 19, 2009

(30) Foreign Application Priority Data

Sep. 14, 2007 (TW) ................................ 96134491 A

(51) Int. Cl.
*F21V 21/00* (2006.01)
(52) U.S. Cl. .................................. 362/217.09; 313/241
(58) Field of Classification Search .................... 362/33, 362/97.1, 217.08, 217.09, 249.01, 260, 265, 362/614, 632, 633, 225; 313/234, 318.02, 313/318.03, 607, 623, 624; 439/226, 232, 439/239, 241
See application file for complete search history.

(56) References Cited

U.S. PATENT DOCUMENTS

| 4,542,947 | A | * | 9/1985 | Flor et al. | 439/232 |
|---|---|---|---|---|---|
| 6,330,150 | B1 | | 12/2001 | Kim | |
| 7,488,086 | B2 | * | 2/2009 | Wu et al. | 362/225 |
| 7,699,496 | B2 | * | 4/2010 | Miyazono | 362/217.01 |
| 7,837,377 | B2 | * | 11/2010 | Lee et al. | 362/633 |
| 2001/0034148 | A1 | * | 10/2001 | Holzer | 439/236 |
| 2005/0127839 | A1 | * | 6/2005 | Choi | 313/607 |
| 2005/0153590 | A1 | * | 7/2005 | McCauley | 439/226 |
| 2006/0063410 | A1 | * | 3/2006 | Lin | 439/242 |

FOREIGN PATENT DOCUMENTS

| CN | 1567048 A | 1/2005 |
|---|---|---|
| CN | 1609680 A | 4/2005 |
| CN | 1737667 A | 2/2006 |

* cited by examiner

*Primary Examiner* — Hargobind S Sawhney
(74) *Attorney, Agent, or Firm* — Altis Law Group, Inc.

(57) ABSTRACT

An exemplary backlight module (20) includes a plurality of linear lamps (21) and a pair of first holders (23). Each linear lamp includes a main body (212) and two electrodes (214) extending respectively from two opposite ends of the main body. Each first holder includes a plurality of cage portions (231), and each cage portion includes at least two parts elastically holding the main body and the electrode at one of the ends of a corresponding one of the linear lamps, at least one of said at least two parts electrically connecting the electrode with the first holder. A liquid crystal display (2) employing the backlight module is also provided.

18 Claims, 5 Drawing Sheets

US 8,104,918 B2

BACKLIGHT MODULE AND LIQUID CRYSTAL DISPLAY UTILIZING SAME

CROSS-REFERENCE TO RELATED APPLICATION

This application is related to, and claims the benefit of, a foreign priority application filed in Taiwan as Serial No. 096134491 on Sep. 14, 2007. The related application is incorporated herein by reference.

FIELD OF THE INVENTION

The present invention relates to a backlight module and a liquid crystal display (LCD) utilizing the backlight module.

GENERAL BACKGROUND

Liquid crystal of an LCD does not itself emit light. Rather, the liquid crystal relies on receiving light from a source such as a backlight that is installed with the LCD. In a typical LCD device, a backlight module provides a uniform flat light source that enables the LCD to display images.

Referring to FIG. 8, a typical LCD 100 includes a liquid crystal module 13, a frame 12, and a plurality of lamps 17. A backlight module (not labeled) is included in the liquid crystal module 13.

Referring also to FIG. 9, a plurality of generally rectangular through holes 131 are defined in an upper beam 130 of a frame of the liquid crystal module 13. Each through hole 131 is bounded on one side by an inwardly slanted structure 132.

When the liquid crystal display 100 is assembled, a rubber endpiece 18 is elastically attached on lateral surfaces of a head portion of each lamp 17. Each lamp 17 with its accompanying rubber endpiece 18 is then inserted through a corresponding through hole 131, and is engaged in position in the liquid crystal module 13 by elastic compression of the rubber endpiece 18 in the through hole 131. In addition, each through hole 131 is bounded in part by the inwardly slanted structure 132, so that the lamp 17 is easily inserted through the through hole 131. A connector 171 of the lamp 17 is electrically connected to a power system (not shown). When the lamps 17 are removed from the liquid crystal module 13, each lamp 17 with its accompanying rubber endpiece 18 is pulled out from the through hole 131. In this process, the elastic force between the rubber endpiece 18 and the slanted structure 132 in the through hole 131 is released. Thereby, the lamps 17 can be replaced.

The lamps 17 are engaged in the through holes 131 of the liquid crystal module 13 only by means of the elastic force between the rubber endpieces 18 and the slanted structures 132 in the through holes 131. The elastic force between each rubber endpiece 18 and the slanted structure 132 may be easily disturbed by vibration or shock. Further, each lamp 17 must be combined with the corresponding rubber endpiece 18 prior to installing of the lamp 17 in the liquid crystal module 13. That is, the rubber endpiece 18 has to be attached on the lateral surfaces of the head portion of the lamp 17 before attaching the combined lamp 17 and rubber endpiece 18 in the liquid crystal module 13. This adds to the time and cost of manufacturing the LCD 100.

What are needed, therefore, are a backlight module and a liquid crystal display device using the backlight module which can overcome the above-described deficiencies.

SUMMARY

An aspect of the invention relates to a backlight module including a plurality of linear lamps and a pair of first holders. Each linear lamp includes a main body and two electrodes extending respectively from two opposite ends of the main body. Each first holder includes a plurality of cage portions, and each cage portion includes at least two parts elastically holding the main body and the electrode at one of the ends of a corresponding one of the linear lamps, at least one of said at least two parts electrically connecting the electrode with the first holder.

Other aspects, novel features and advantages will become more apparent from the following detailed description when taken in conjunction with the accompanying drawings.

DETAILED DESCRIPTION OF EMBODIMENTS

Reference will now be made to the drawings to describe preferred and exemplary embodiments in detail.

Figure 1:
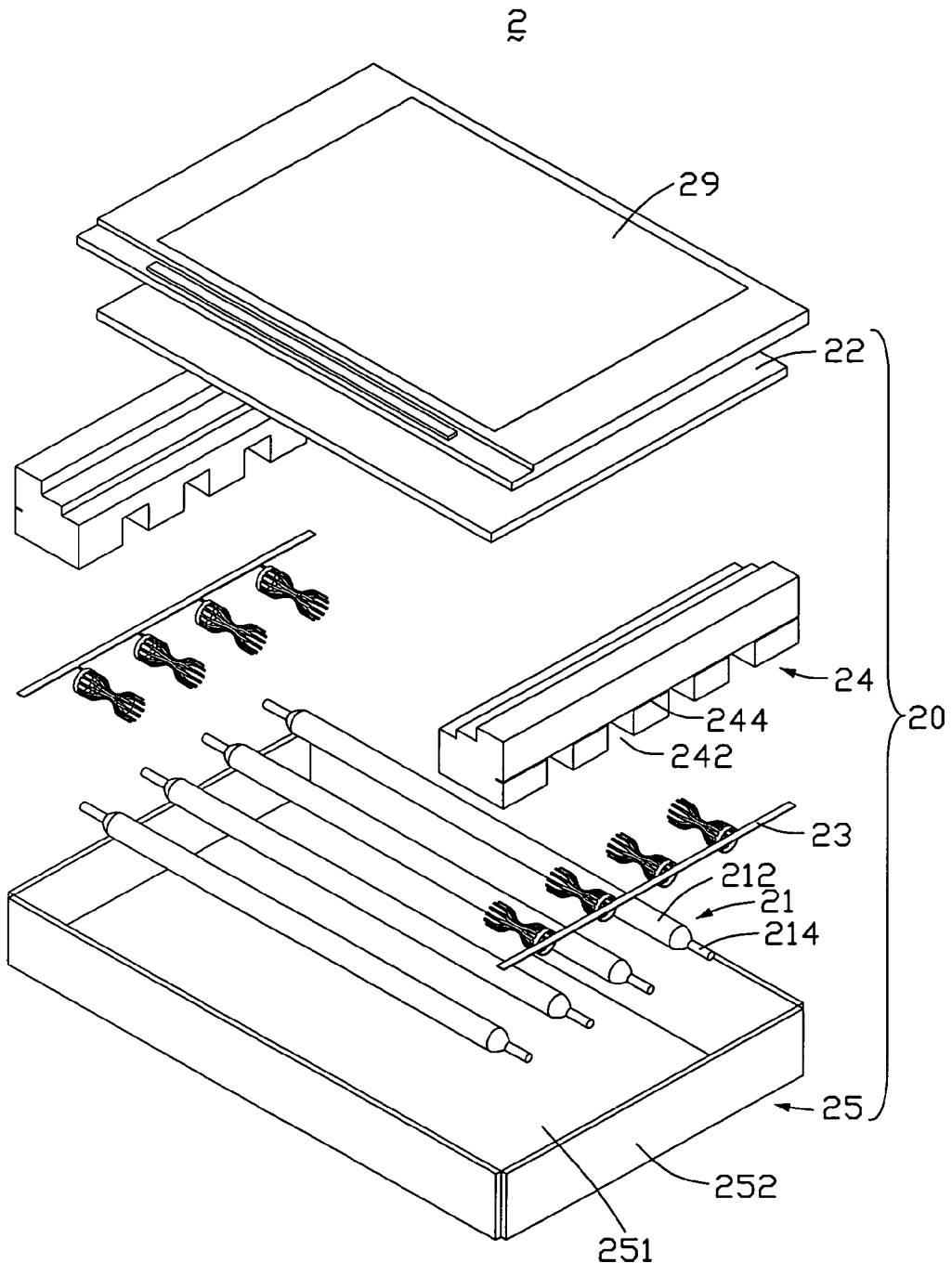
FIG. 1 is an exploded, isometric view of an LCD according to a first embodiment of the present invention, the LCD having a plurality of linear fluorescent lamps, a pair of first holders, and a pair of second holders.

Referring to FIG. 1, a liquid crystal display 2 according to an exemplary embodiment of the present invention is shown. The liquid crystal display 2 includes a liquid crystal panel 29, and a backlight module 20 adjacent an underside of the liquid crystal panel 29.

The backlight module 20 is a direct type backlight module, and includes a diffusion film 22, a pair of holder apparatuses (not labeled), a plurality of linear fluorescent lamps 21, a reflector (not shown), and a frame 25. The diffusion film 22, the holder apparatuses, the linear fluorescent lamps 21, and the reflector are accommodated in the frame 25 from top to bottom when the LCD 2 is assembled. Each holder apparatus includes a first holder 23 and a second holder 24. The linear fluorescent lamps 21 can be securely fixed in the pair of holder apparatuses by the cooperation of the first holders 23 and the second holders 24.

The frame 25 includes a rectangular bottom plate 251, and four side walls 252 perpendicularly and upwardly extending from four edges of the bottom plate 251, respectively. The frame 25 further includes a reflective material (not shown) with high reflection capability coated on inner surfaces of the bottom plate 251 and the four side walls 252.

The linear fluorescent lamps 21 are typically cold cathode fluorescent lamps (CCFLs). Each linear fluorescent lamp 21 includes a main body 212 and two electrodes 214. A diameter of each electrode 214 is less than a diameter of the main body 212.

Figure 2:
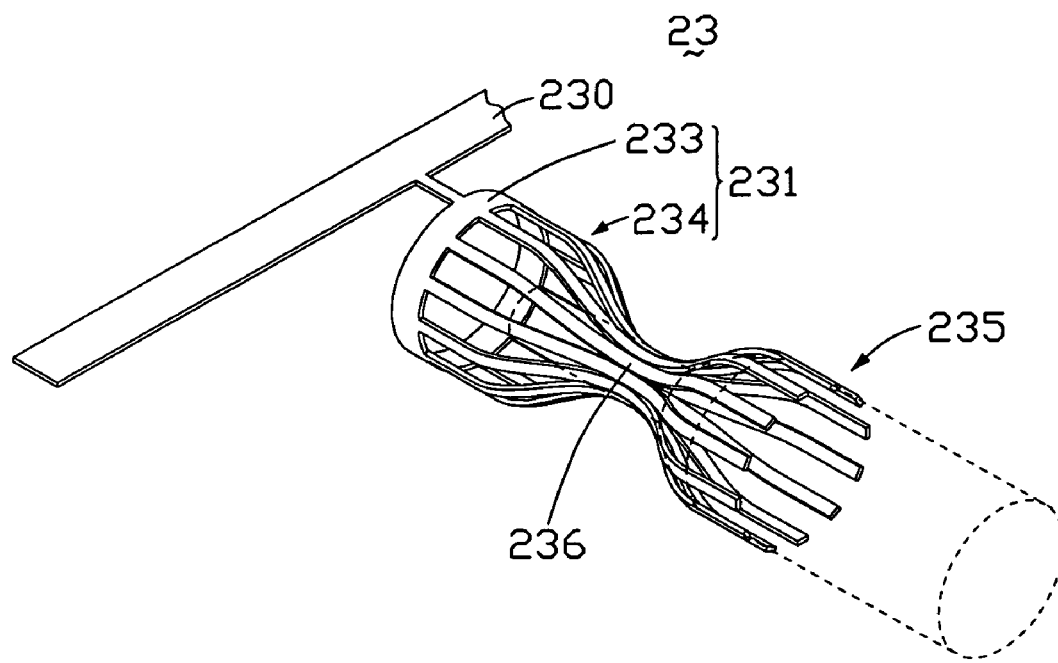
FIG. 2 is an isometric, enlarged view of part of one of the first holders of FIG. 1.
Figure 3:
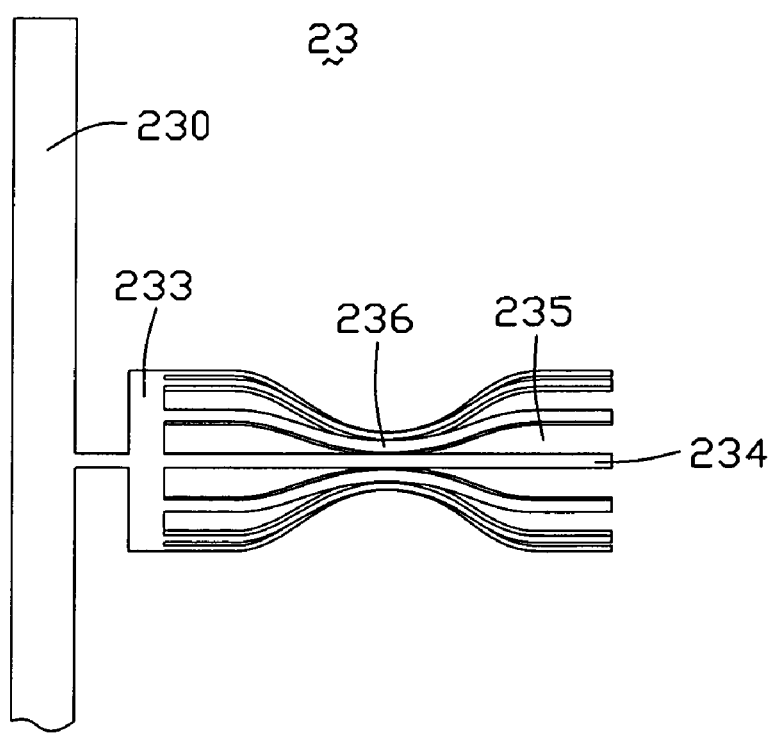
FIG. 3 is a top side view of the first holder of FIG. 2.

Referring also to FIG. 2 and FIG. 3, each first holder 23 includes a conducting beam 230 and a plurality of cage portions 231 horizontally connected to the conducting beam 230 by respective connecting arms (not labeled). That is, the cage portions 231 are electrically connected to the conducting beam 230 via the connecting arms. Each cage portion includes a ring 233, and a plurality of conducting strips 234 extending from one edge of the ring 233. The plurality of conducting strips 234 defines a proximal cage (not labeled), a waist 236, and a distal cage 235 in that order, for elastically holding one end of a respective linear fluorescent lamp 21. A diameter of the waist 236 is less than a diameter of the proximal cage, and less than a diameter of the distal cage 235. In the illustrated embodiment, the diameter of the proximal cage is the same as the diameter of the distal cage 235. Overall, the first holder 23 generally has the shape of an hourglass. The conducting strips 234 are radially symmetrically arranged about a central axis of the cage portion 231. The conducting strips 234 at the proximal cage are substantially parallel to each other. The conducting strips 234 at the distal cage 235 are substantially parallel to each other. The diameter of the distal cage 235 is substantially the same as or slightly less than the diameter of the main body 212 of the linear fluorescent lamp 21. The diameter of the waist 236 is substantially the same as or slightly less than the diameter of the electrode 214 of the linear fluorescent lamp 21.

Each second holder 24 is configured as a fixing beam, and includes a horizontal groove 244 corresponding to the respective conducting beam 230, and a plurality of channels 242 corresponding to the respective cage portions 231. The channels 242 are in communication with the horizontal groove 244. The horizontal groove 244 is located at a longitudinal side surface of the second holder 24, and the channels 242 are located at a bottom surface and the longitudinal side surface of the second holder 24. That is, the horizontal groove 244 is perpendicular to the channels 242.

Figure 4:
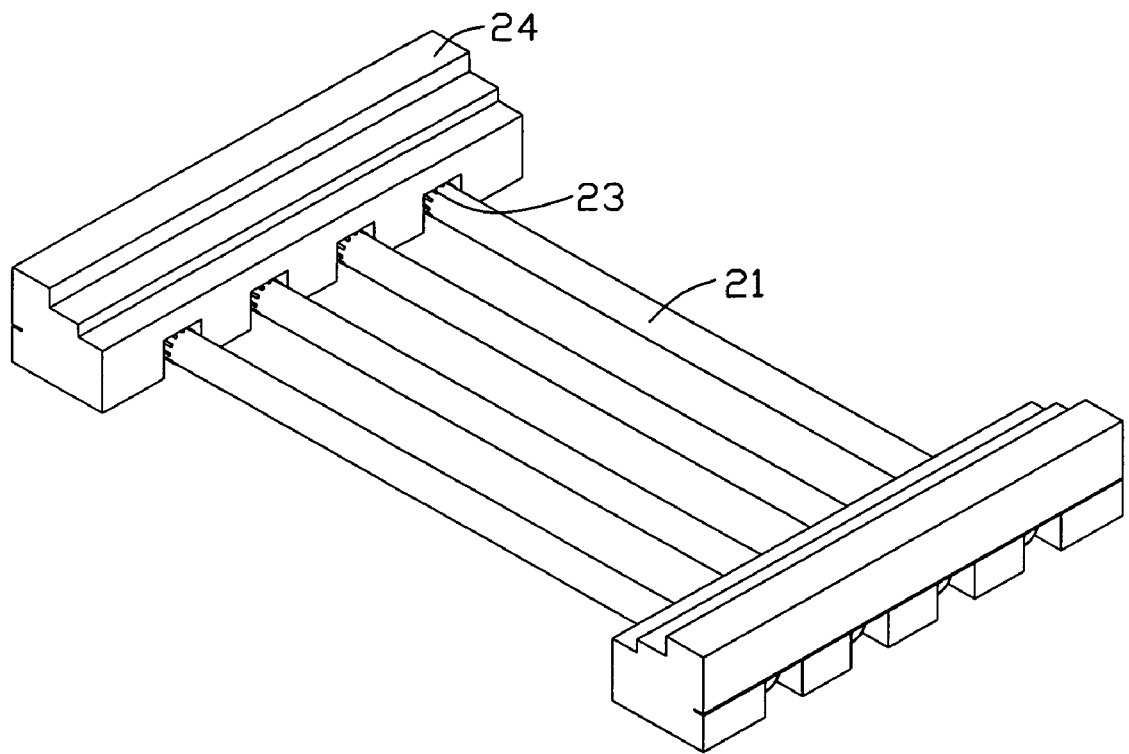
FIG. 4 is an assembled view of the first holders, the second holders and the linear fluorescent lamps of FIG. 1.

Referring also to FIG. 4, in assembly of the backlight module 20, the pair of holder apparatuses are disposed symmetrically opposite to each other. The conducting beam 230 of each first holder 23 is disposed in the horizontal groove 244 of the corresponding second holder 24, and the cage portions 231 of the first holder 23 are disposed in the channels 242 of the second holder 24. The main body 212 and one electrode 214 of each linear fluorescent lamp 21 are inserted into the distal cage 235 and waist 236 of a corresponding cage portion 231. The main body 212 and the electrode 214 elastically deform (expand) the distal cage 235 and the waist 236, so that the main body 212 and the electrode 214 are easily received in the cage portion 231. Then the cage portion 231 elastically holds the end of the linear fluorescent lamp 21. In particular, because the diameters of the distal cage 235 and the waist 236 are substantially the same as or slightly less than the diameters of the main body 212 and the electrode 214 respectively, the cage portion 231 can maintain elastic compression around and thereby securely retain the end of the linear fluorescent lamp 21. Thereby, the two ends of the linear fluorescent lamp 21 are firmly held between the pair of holder apparatuses. In addition, in FIG. 2, part of the electrode 214 (shown in phantom) is accommodated in the proximal cage. That is, the proximal cage provides leeway in the case that the electrode 214 is a long electrode.

Furthermore, in one embodiment, the linear fluorescent lamp 21 can be removed from the cage portions 231 simply by interferentially sliding each end of the linear fluorescent lamp 21 out from the corresponding cage portion 231. Alternatively, the distal cage 235 and the waist 236 of each cage portion 231 can be opened by exerting radially outward force on one or more of the conducting strips 234. In either case, the linear fluorescent lamps 21 can be conveniently released from the cage portions 231. In summary, because the main body 212 and the electrodes 214 are easily received in and removed from the cage portions 231, assembly and disassembly of the backlight module 20 is both convenient and speedy.

With the above-described configurations, the pair of holder apparatuses firmly retains the linear fluorescent lamps 21 therebetween. The linear fluorescent lamps 21 are apt to not be accidentally detached from the holder apparatuses. In addition, when assembling the backlight module 20, the linear fluorescent lamps 21 can be quickly and safely engaged in the holder apparatuses. Similarly, the linear fluorescent lamps 21 can be quickly and safely removed from the holder apparatuses. Furthermore, unlike with conventional backlight modules, no rubber endpieces need be attached to the linear fluorescent lamps 21. Thus, the backlight module 20 provides good mechanical performance, and easy manufacturing and assembly. Additionally, a power source (not shown) can be connected to the electrodes 214 via the first holders 23, for providing power to the linear fluorescent lamps 21.

Figure 5:
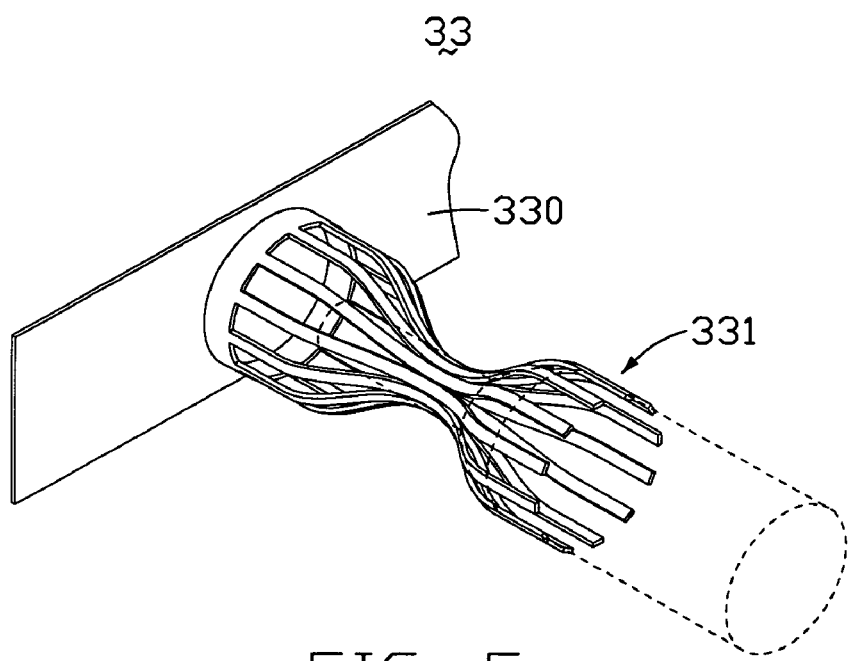
FIG. 5 is an isometric view of part of a first alternative embodiment of the first holder.

Referring to FIG. 5, part of a first holder 33 according to a first alternative embodiment of the present invention is shown. The first holder 33 is similar to the first holder 23, except that there are no connecting arms. In the first holder 33, a plurality of cage portions 331 are directly and perpendicularly connected to a conducting beam 330. Thereby, the cage portions 331 are electrically connected to the conducting beam 330. A horizontal groove and a plurality of channels are all located at a top surface of a second holder (not shown).

Figure 6:
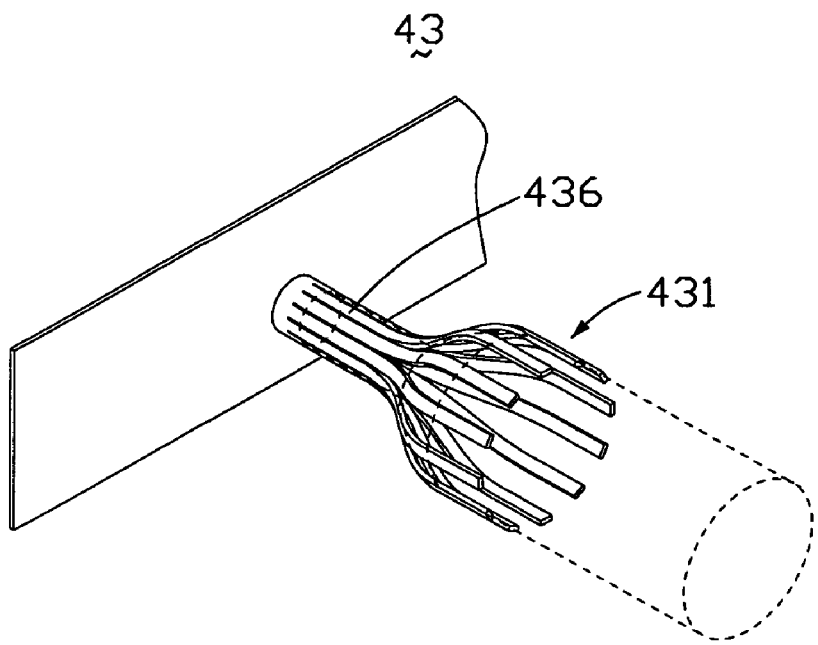
FIG. 6 is an isometric view of part of a second alternative embodiment of the first holder.

Referring to FIG. 6, part of a first holder 43 according to a second alternative embodiment of the present invention is shown. The first holder 43 is similar to the first holder 33, except that there are no proximal cages. In the first holder 43, a plurality of cage portions 431 are perpendicularly connected to a conducting beam (not labeled). Each cage portion 431 includes a ring (not labeled), a neck 436, and a distal cage (not labeled). The neck 436 is configured for elastically holding the electrode of one end of a linear fluorescent lamp (shown in phantom), and the distal cage is configured for holding the main body of the end of the linear fluorescent lamp.

Figure 7:
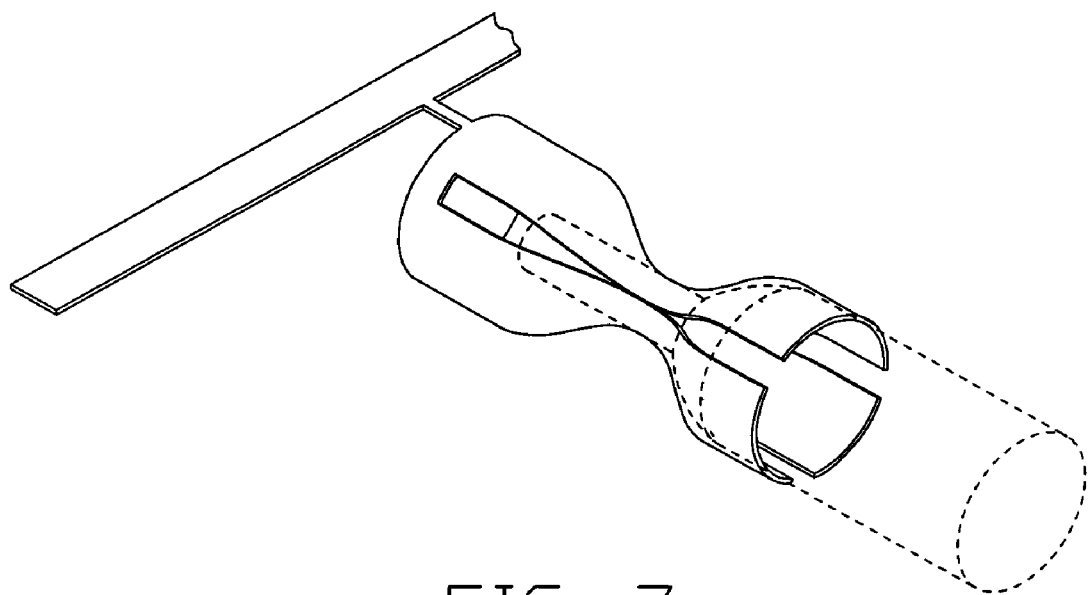
FIG. 7 is an isometric view of part of a third alternative embodiment of the first holder.
Figure 8:
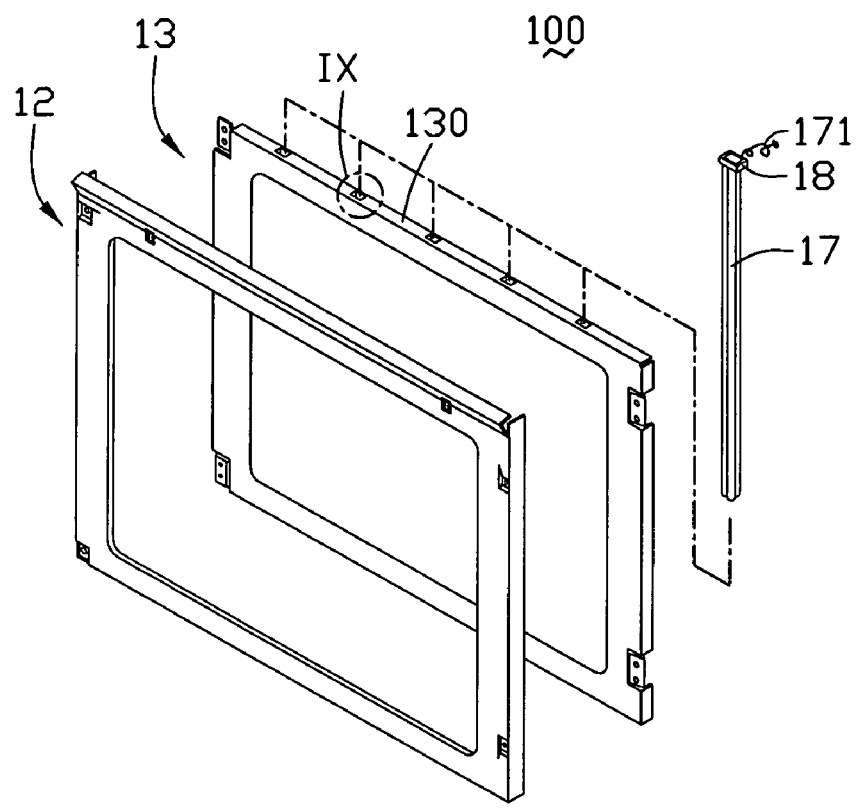
FIG. 8 is an exploded, isometric view of a conventional LCD.
Figure 9:
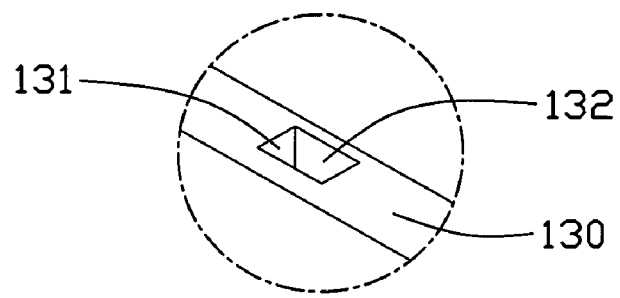
FIG. 9 is an enlarged view of a circled portion IX of FIG. 8.

Further or alternative embodiments may include the following. The shape of each first holder 23, 33, 43 can vary according to requirements. The quantity of first holders 22, 33, 43, second holders, cage portions 231, 331, 431 and conducting strips can vary according to requirements. In one example, each cage portion 231, 331, 431 may include only two conducting strips, which conducting strips are oriented symmetrically opposite to each other about a central axis of the cage portion. The conducting strips can maintain elastic compression around the main body 212 and the electrode 214 of one end of the linear fluorescent lamp 21 respectively. In another example, there can be three conducting strips oriented radially symmetrically to each other about a central axis of the cage portion (as shown in FIG. 7).

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:
1. A backlight module comprising:
   a plurality of linear lamps, each linear lamp comprising a main body and two electrodes extending respectively from two opposite ends of the main body, wherein a diameter of each of the electrodes is less than a diameter of the main body; and a pair of first holders, each first holder comprising a conducting beam and a plurality of cage portions extending away from the conducting beam, each cage portion comprising at least two parts elastically holding the main body and the electrode at one of the ends of a corresponding one of the linear lamps, at least one of said at least two parts electrically connecting the electrode with the first holder.

2. The backlight module of claim 1, wherein each cage portion comprises a ring and a plurality of conducting strips extending from one edge of the ring, the plurality of conducting strips defining a proximal cage, a waist, and a distal cage, the waist being one of said at least two parts and elastically holding the electrode of the linear lamp, the distal cage being another one of said at least two parts and elastically holding the main body at the end of the linear lamp.

3. The backlight module of claim 2, wherein the conducting strips are radially symmetrically arranged about a central axis of the cage portion, and a diameter of the waist is less than a diameter of the proximal cage, and less than a diameter of the distal cage.

4. The backlight module of claim 2, wherein a diameter of the distal cage is substantially the same as or slightly less than the diameter of the main body, and a diameter of the waist is substantially the same as or slightly less than the diameter of the electrode.

5. The backlight module of claim 2, further comprising a pair of second holders, each of the second holders comprising a groove and a plurality of channels, the groove holding the conducting beam of a corresponding one of the first holders, the channels holding the cage portions of the first holder.

6. The backlight module of claim 1, wherein each cage portion comprises a ring and a plurality of conducting strips extending from one edge of the ring, the plurality of conducting strips defining a neck being one of said at least two parts and elastically holding the electrode of the linear lamp, and a distal cage being another one of said at least two parts and elastically holding the main body at the end of the linear lamp.

7. The backlight module of claim 1, wherein each cage portion is connected to the conducting beam by a connecting arm.

8. The backlight module of claim 1, wherein each cage portion directly extends from the conducting beam.

9. A liquid crystal display comprising:
a liquid crystal panel; and
a backlight module adjacent the liquid crystal panel, the backlight module comprising:
a plurality of linear lamps, each linear lamp comprising a main body and two electrodes extending respectively from two opposite ends of the main body, a diameter of each of the electrodes being less than a diameter of the main body; and
a pair of first holders, each first holder comprising a plurality of cage portions;
wherein each of the cage portions is configured to elastically and electrically hold one end of the linear lamp, and each cage portion comprises a ring and a plurality of conducting strips extending from one edge of the ring, the plurality of conducting strips defining a proximal cage, a waist, and a distal cage, the waist elastically holding the electrode of the linear lamp, the distal cage elastically holding the main body at the end of the linear lamp.

10. The liquid crystal display of claim 9, wherein each first holder further comprises a conducting beam, and the cage portions of the first holder extend away from the conducting beam.

11. The liquid crystal display of claim 10, wherein the backlight module further comprises a second holder, the second holder comprising a groove and a plurality of channels, the groove holding the conducting beam of a corresponding one of the first holders, the channels holding the cage portions of the first holder.

12. The liquid crystal display of claim 10, wherein each cage portion is connected to the conducting beam by a connecting arm.

13. The liquid crystal display of claim 10, wherein each cage portion directly extends from the conducting beam.

14. The liquid crystal display of claim 9, wherein the conducting strips are radially symmetrically arranged about a central axis of the cage portion, and a diameter of the waist is less than a diameter of the proximal cage, and less than a diameter of the distal cage.

15. The liquid crystal display of claim 9, wherein a diameter of the distal cage is substantially the same as or slightly less than the diameter of the main body, and a diameter of the waist is substantially the same as or slightly less than the diameter of the electrode.

16. A backlight module comprising:
a plurality of lamps, each lamp comprising a main body and two electrodes extending from two opposite ends of the main body, respectively; and
a pair of first holders, each first holder being a one-piece member and configured for holding a corresponding end of the main bodies of the lamps and transmitting electrical signals to a corresponding electrode of the lamps, each first holder comprising a conductive base capable of receiving the electrical signals and a plurality of cage portions extending away from the conductive base;
wherein each cage portion comprises a ring and a plurality of conducting strips extending away from the ring, the plurality of conducting strips defining a proximal cage, a waist, and a distal cage, each distal cage forms a first clasping portion, each waist forms a second clasping portion connecting the first clasping portion with the conductive base, and the proximal cage connects the waist and the ring, each of the first clasping portions and the second clasping portions is deformable, each end of the main bodies of the lamp is elastically clasped by the first clasping portions of the corresponding cage portions, and each electrode is elastically clasped by the second portions of the corresponding cage portions.

17. The backlight module of claim 16, wherein the conducting strips are radially symmetrically arranged about a central axis of the cage portion, and a diameter of the waist is less than a diameter of the proximal cage, and less than a diameter of the distal cage.

18. The backlight module of claim 16, further comprising a pair of second holders, each of the second holders comprising a groove and a plurality of channels, the groove holding the conductive base of a corresponding one of the first holders, the channels holding the cage portions of the first holder.

* * * * *